United States Patent
Wang et al.

(10) Patent No.: US 12,221,006 B2
(45) Date of Patent: Feb. 11, 2025

(54) MANAGEMENT METHODS AND SYSTEMS FOR ENERGY AND CHARGING REQUESTS OF AN ELECTRIC VEHICLE CHARGING FIELD

(71) Applicant: Noodoe Group Inc., Taipei (TW)

(72) Inventors: John C. Wang, Taipei (TW); Yu-Ting Liou, Taipei (TW); Yi-An Hou, Taipei (TW); Chun-Hung Kung, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 507 days.

(21) Appl. No.: 17/578,527

(22) Filed: Jan. 19, 2022

(65) Prior Publication Data
US 2022/0305947 A1 Sep. 29, 2022

(30) Foreign Application Priority Data
Mar. 26, 2021 (TW) .................................. 110111196

(51) Int. Cl.
| | |
|---|---|
| *B60L 53/67* | (2019.01) |
| *B60L 53/62* | (2019.01) |
| *B60L 53/68* | (2019.01) |
| *G06N 20/00* | (2019.01) |
| *H02J 3/14* | (2006.01) |
| *H02J 7/00* | (2006.01) |

(52) U.S. Cl.
CPC .............. *B60L 53/68* (2019.02); *B60L 53/62* (2019.02); *B60L 53/67* (2019.02); *G06N 20/00* (2019.01); *H02J 7/00032* (2020.01); *H02J 7/0013* (2013.01)

(58) Field of Classification Search
CPC .......... B60L 53/68; B60L 53/62; B60L 53/67; B60L 2260/46; B60L 53/63; G06N 20/00; H02J 7/00032; H02J 7/0013; H02J 3/003; H02J 3/144; H02J 13/00016; H02J 13/00022; H02J 13/00032; H02J 2203/20; H02J 2310/48
See application file for complete search history.

(56) References Cited

U.S. PATENT DOCUMENTS

| | | | |
|---|---|---|---|
| 2011/0001356 A1* | 1/2011 | Pollack | H02J 7/00 307/31 |
| 2021/0086647 A1* | 3/2021 | Kiessling | B60L 53/67 |

\* cited by examiner

*Primary Examiner* — Nghia M Doan
(74) *Attorney, Agent, or Firm* — McClure, Qualey & Rodack, LLP (57) ABSTRACT

Management methods and systems for energy and charging requests of an electric vehicle charging field are provided. First charging data corresponding to at least one first charging operation is received by a server from each of electric vehicle charging stations in a charging field via a network during a first predetermined period, wherein the charging data includes at least a charging start time, a charging period, and an output power. According to the first charging data corresponding to the at least one first charging operation received from each of the electric vehicle charging stations during the first predetermined period, the server generates an energy prediction data of the charging field in a second predetermined period, wherein the energy prediction data includes at least an energy consumption estimation of the charging field at a specific time point.

15 Claims, 10 Drawing Sheets

MANAGEMENT METHODS AND SYSTEMS FOR ENERGY AND CHARGING REQUESTS OF AN ELECTRIC VEHICLE CHARGING FIELD

BACKGROUND OF THE INVENTION

Field of the Invention

The disclosure relates generally to methods and systems for charging request managements of electric vehicles, and, more particularly to methods and systems that can predict the energy request of a charging field and perform management on the charging request.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

With the increase in electric vehicles, the power consumption caused by electric vehicle charging has become one of the issues that governments, power plants, and charging fields are paying attention to. At the same time, in order to achieve a balance between power supply and consumption, the industry is also actively launching various solutions to face energy management issues. For example, the number of electric vehicle charging stations that can be installed in a single charging field is limited by the existing maximum load capacity of the charging field. Therefore, under the premise of not updating the power equipment, some charging fields can implement load balancing operations to increase the number of electric vehicle charging stations that can be installed in the field. In the load balancing operation, by reducing the power output of individual electric vehicle charging stations, more electric vehicles can be charged in this charging field at the same time. In another example, the power plant can sign a contract with the operator of the charging field to implement a demand response procedure during the peak of electricity consumption to reduce the output power of the electric vehicle charging stations. Through the demand response process, the power plant can avoid the crisis of insufficient power during the peak power consumption.

Electric vehicle charging stations may consume more and more power energy as the development of electric vehicles grows, resulting in a potential increase in the risk of power supply from power plants. If the power energy consumption and charging requests of the electric vehicle charging field can be properly planned and predicted, the impact of the development of electric vehicles on the environment can be greatly reduced.

BRIEF SUMMARY OF THE INVENTION

In a management method for energy and charging requests of an electric vehicle charging field, first charging data corresponding to at least one first charging operation is first received by a server from each of electric vehicle charging stations in a charging field via a network during a first predetermined period, wherein the charging data includes at least a charging start time, a charging period, and an output power. According to the first charging data corresponding to the at least one first charging operation received from each of the electric vehicle charging stations during the first predetermined period, the server generates an energy prediction data of the charging field in a second predetermined period, wherein the energy prediction data includes at least an energy consumption estimation of the charging field at a specific time point.

An embodiment of a management system for energy and charging requests of an electric vehicle charging field includes a charging field with a plurality of electric vehicle charging stations and a server. The server connects with the respective electric vehicle charging stations via a network, and receives first charging data corresponding to at least one first charging operation from each of the electric vehicle charging stations via the network during a first predetermined period, wherein the first charging data comprises at least a charging start time, a charging period, and an output power. The server generates energy prediction data of the charging field in a second predetermined period according to the first charging data corresponding to the at least one first charging operation received from each of the electric vehicle charging stations during the first predetermined period, wherein the energy prediction data comprises at least an energy consumption estimation of the charging field at a specific time point.

In some embodiments, the server trains a prediction model according to the first charging data corresponding to the at least one first charging operation received from each of the electric vehicle charging stations during the first predetermined period, and generates the energy prediction data of the charging field in the second predetermined period according to the prediction model.

In some embodiments, the server receives second charging data corresponding to at least one second charging operation from each of the electric vehicle charging stations via the network during the second predetermined period. The server continuously inputs the second charging data corresponding to the at least one second charging operation into the prediction model to train the prediction model.

In some embodiments, the server receives a charging query from a mobile device via the network, wherein the charging query includes at least one energy request. The server determines whether to provide charging station information corresponding to the charging field to the mobile device according to the energy prediction data of the charging field and the energy request.

In some embodiments, the server connects to each of the electric vehicle charging stations in the charging field via the network to determine the usage status of each of the electric vehicle charging stations. The server determines whether to provide the charging station information corresponding to the charging field to the mobile device according to the usage status of each of the electric vehicle charging stations, the energy prediction data of the charging field, and the energy request.

In some embodiments, the server receives a charging query from a mobile device via the network, wherein the charging query includes at least one energy request, and calculates an estimated charging time based on the energy prediction data of the charging field and the energy request.

The server transmits the estimated charging time to the mobile device via the network.

In some embodiments, the server further receives a demand request corresponding to a power plant via the network. The server determines whether to execute a demand response procedure according to the energy prediction data of the charging field in response to the demand request.

In some embodiments, the server further dynamically determines a charging rate corresponding to the specific time point according to the energy prediction data of the charging field, wherein the charging rate corresponding to the specific time point is set to be lower than a predetermined rate of the charging field when the energy consumption estimation of the charging field at the specific time point is lower than a predetermined value.

Management methods for energy and charging requests of the electric vehicle charging field may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
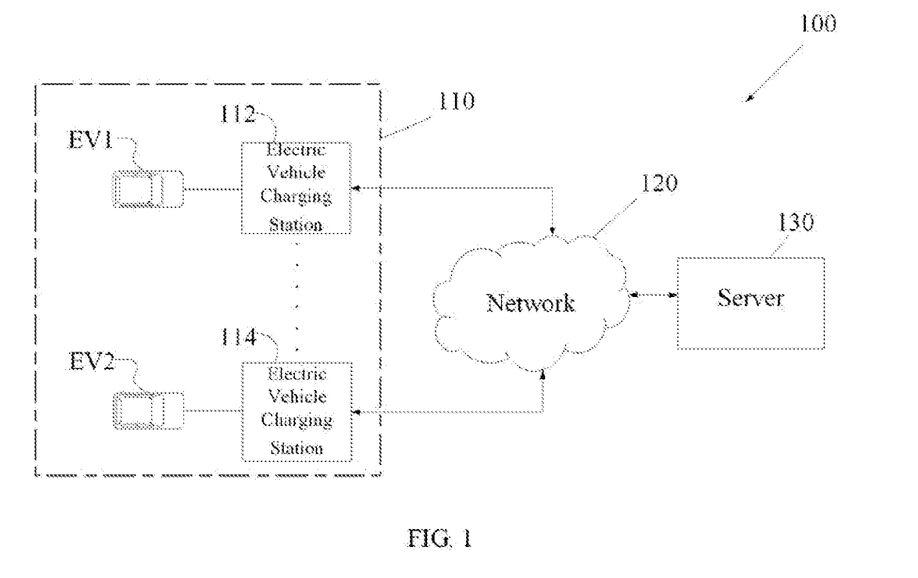
FIG. 1 is a schematic diagram illustrating an embodiment of a management system for energy and charging requests of an electric vehicle charging field of the invention.

FIG. 1 is a schematic diagram illustrating an embodiment of a management system for energy and charging requests of an electric vehicle charging field 100 can be used in a charging filed 110 with a plurality of electric vehicle charging stations. It is noted that, the charging filed 110 has a power limitation. As shown in FIG. 1, the management system for energy and charging requests of the electric vehicle charging field 100 comprises a plurality of electric vehicle charging stations (112-114), and a server 130 respectively connected with the respective electric vehicle charging stations via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the respective electric vehicle charging stations via the network 120, and transmit related signals to the respective electric vehicle charging stations. The respective electric vehicle charging stations can perform related operations according to the signals received from the server 130. For example, when the electric vehicle EV1 is coupled to the electric vehicle charging station 112 through a charging gun of the electric vehicle charging station 112 for a charging operation, the electric vehicle charging station 112 can continuously transmit charging information corresponding the charging operation of the electric vehicle EV1 via the network 120, and the server 130 can receive the charging information of the corresponding charging operation from the electric vehicle charging station 112 via the network 120. In some embodiments, the charging information may include at least a charging start time, a charging period, an output power, and/or related information indicating whether a load balancing operation is being performed. The server 130 can know the usage status of the corresponding electric vehicle charging station according to the charging information. Similarly, when the electric vehicle EV2 is coupled to the electric vehicle charging station 114 through a charging gun of the electric vehicle charging station 114 to perform a charging operation, the electric vehicle charging station 114 can continuously transmit the charging information corresponding the charging operation of the electric vehicle EV2 via the network 120, and the server 130 can receive the charging information of the corresponding charging operation from the electric vehicle charging station 114 via the network 120.

It is noted that the user can connect the electric vehicle EV1 and the electric vehicle charging station 112 to each other, such as inserting a charging gun into the charging port of the electric vehicle to send a charging request corresponding to the electric vehicle charging station 112 to use the electric vehicle charging station 112. The electric vehicle charging station 112 performs a charging operation for the electric vehicle EV1. Similarly, the user can connect the electric vehicle EV2 and the electric vehicle charging station 114 to each other, such as inserting a charging gun into the charging port of the electric vehicle to send a charging request corresponding to the electric vehicle charging station 114 to use the electric vehicle charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the electric vehicle charging station 112 via the network 120, so that the electric vehicle charging station 112 outputs power to the electric vehicle EV1, such as an electric scooter or an electric car, which is electrically connected to it, or prohibits the electric vehicle charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the electric vehicle charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the electric vehicle charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load balancing operation for the electric vehicle charging stations in the charging field 110 according to at least one energy management scheme. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle.

Figure 2:
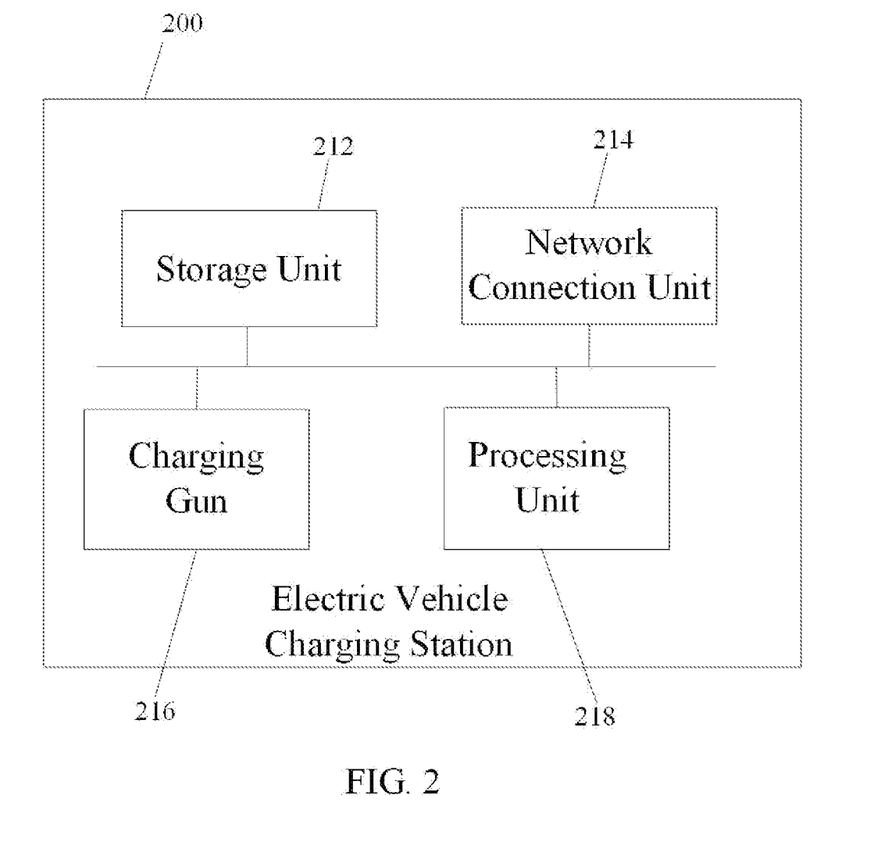
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the electric vehicle charging stations (112, 114) in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the management methods for energy and charging requests of an electric vehicle charging field of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is noted that, in some embodiments, the electric vehicle charging station 200 may comprise an RFID reading unit for sensing information of an RFID card, such as a user ID code of an electric vehicle owner.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
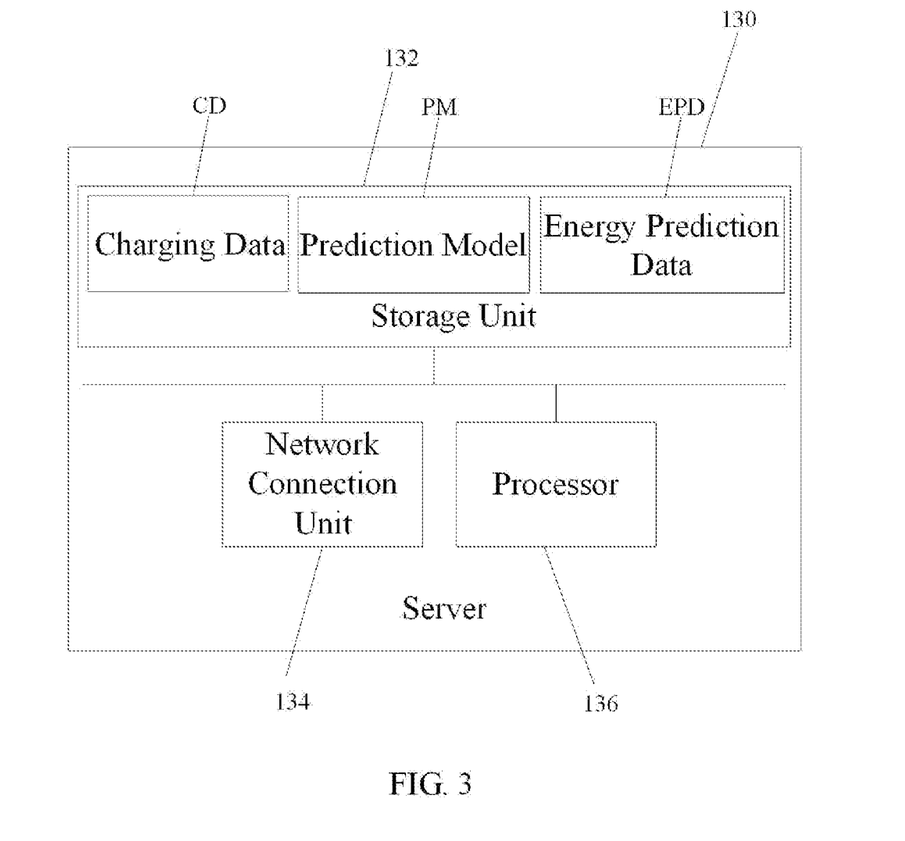
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is noted that, the storage unit 132 may comprise charging data CD, a prediction model PM, and energy prediction data EPD. The charging data CD is received from the respective electric vehicle charging stations in the charging field via the network. As mentioned above, the charging data CD may comprise a charging start time, a charging period, and an output power corresponding to a charging operation, and/or related information indicating whether a load balancing operation is being performed. The predictive model PM can be trained and generated using the charging data CD. In some embodiments, the server 130 may train the prediction model PM according to a machine learning technique, wherein the prediction model PM can be a linear regression model. The energy prediction data EPD of the charging field can be obtained based on the charging data CD and the prediction model PM. It should be noted that, in some embodiments, the energy prediction data EPD may include an energy consumption estimation of the charging field at a specific time point. In some embodiments, the energy prediction data EPD of the charging field may further record whether the electric vehicle charging station performs a load adjustment operation at a specific time point, and the output power of each electric vehicle charging station during the load adjustment operation. In addition, in some embodiments, the storage unit 132 may record at least one energy management scheme (not shown in FIG. 3), which records the power distribution logic when a load balancing operation is performed in the charging field, and is used to control the charging operations corresponding to the respective electric vehicle charging stations. It is noted that, the power distribution logic is configured to determine the execution sequence of the respective charging requests corresponding to the respective charging stations under the power limitation of the charging field, and the target power parameter value for the corresponding charging request when it is executed. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the management methods for energy and charging requests of the electric vehicle charging field of the invention. The relevant details will be described later. It is reminded that, when there are multiple energy management schemes in the server, the processor 136 can select one of the energy management schemes, and perform a load balancing operation for the charging field according to the selected energy management scheme. It is understood that, in some embodiments, the processor 136 may be a general-purpose controller, a Micro-Control Unit, MCU, or a Digital Signal Processor, DSP, etc., to provide data analysis, processing, and calculation functions, and the invention is not limited thereto.

Figure 4:
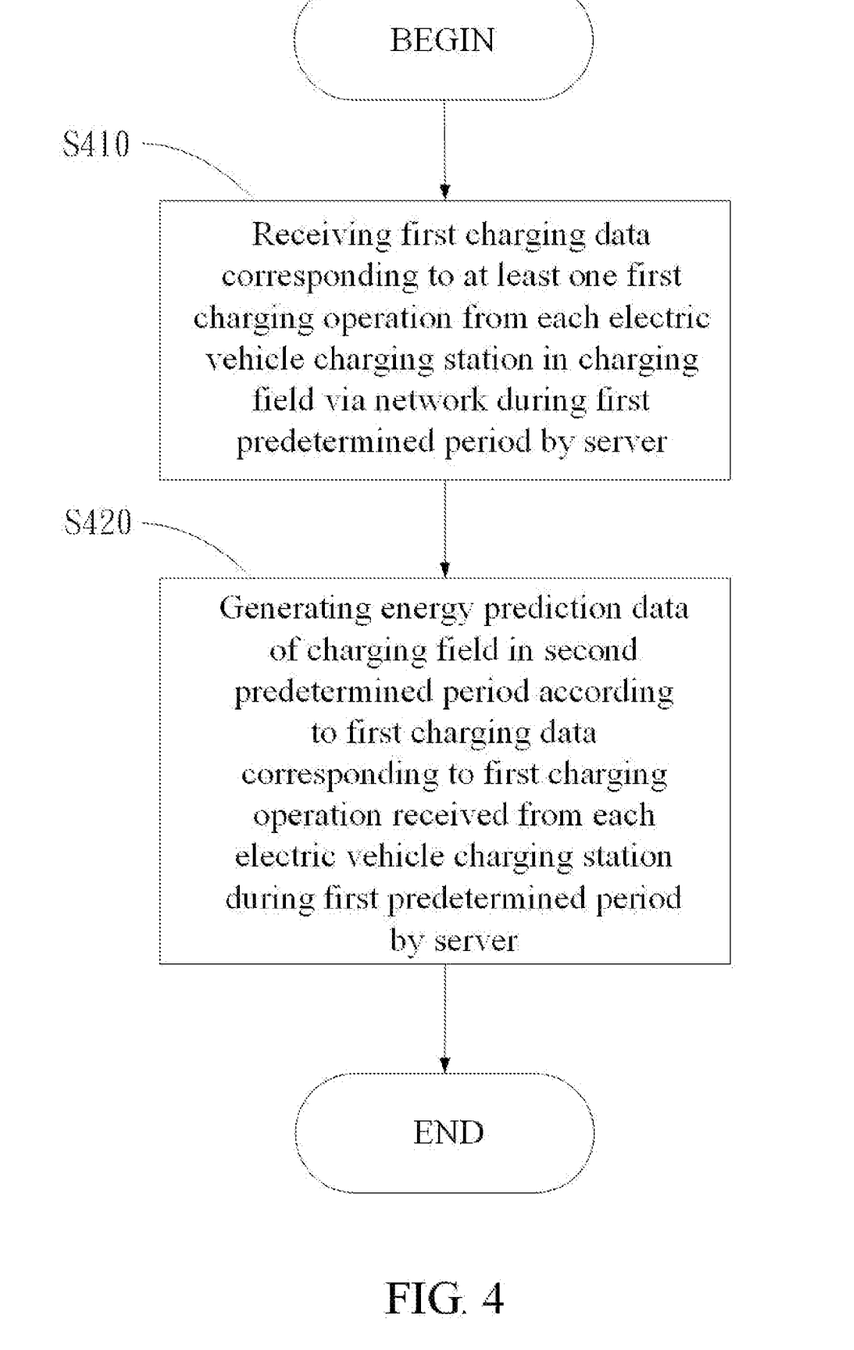
FIG. 4 is a flowchart of an embodiment of a management method for energy and charging requests of an electric vehicle charging field of the invention.

FIG. 4 is a flowchart of an embodiment of a management method for energy and charging requests of an electric vehicle charging field of the invention. The management method for energy and charging requests of the electric vehicle charging field of the invention is applicable to a charging field with a plurality of electric vehicle charging stations, and the charging field has a power limit. The respective electric vehicle charging station in the charging field can be electrically coupled with a remote server via a network.

First, in step S410, the server receives first charging data corresponding to at least one first charging operation from each of the electric vehicle charging stations in the charging field through the network during a first predetermined period. It should be noted that, in some embodiments, the first charging data may include at least a charging start time, a charging period, an output power, and/or related information indicating whether a load adjustment operation is being performed. Next, in step S420, the server generates energy prediction data of the charging field in a second predetermined period according to the first charging data corresponding to the at least one first charging operation received from each electric vehicle charging station during the first predetermined period. It should be noted that, in some embodiments, the energy prediction data may at least include an energy consumption estimation of the charging field at a specific time point. In some embodiments, the energy prediction data may further record whether the electric vehicle charging station performs a load adjustment operation at a specific time point, and the output power of each electric vehicle charging station during the load adjustment operation.

Figure 5:
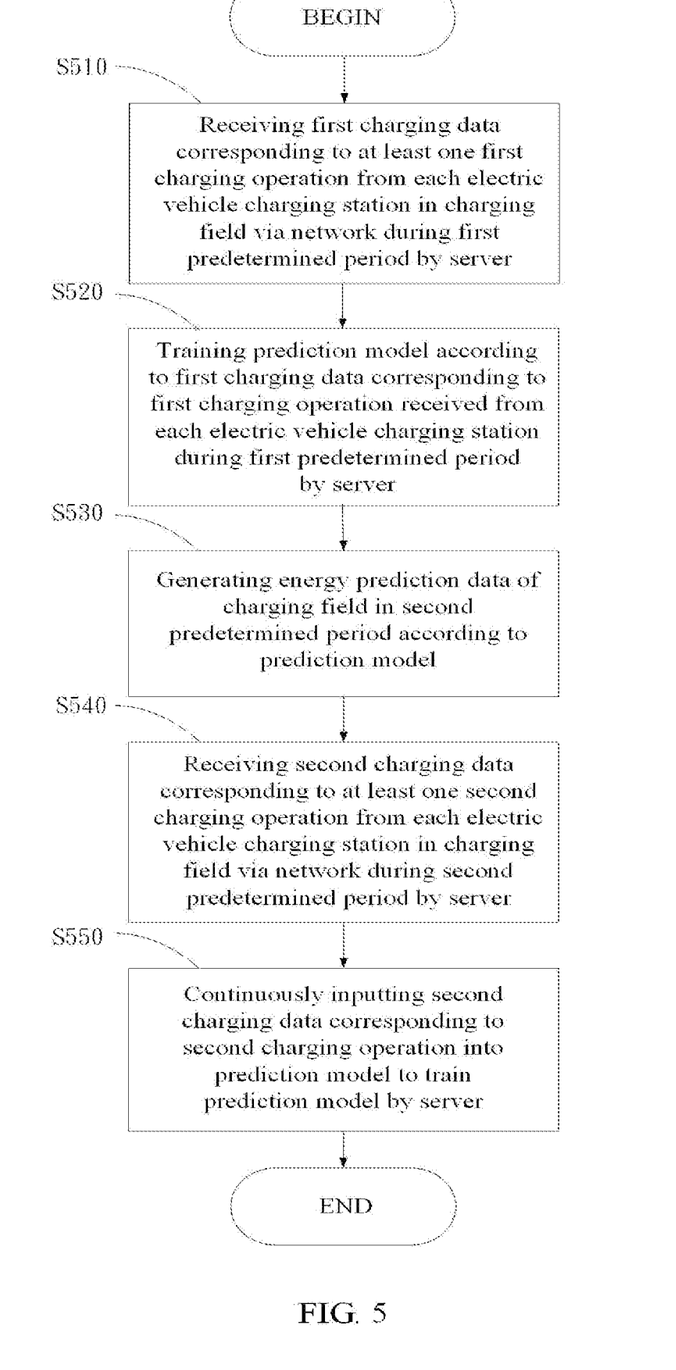
FIG. 5 is a flowchart of another embodiment of a management method for energy and charging requests of the electric vehicle charging field of the invention.

FIG. 5 is a flowchart of another embodiment of a management method for energy and charging requests of the electric vehicle charging field of the invention. The management method for energy and charging requests of the electric vehicle charging field of the invention is applicable to a charging field with a plurality of electric vehicle charging stations, and the charging field has a power limit. The respective electric vehicle charging station in the charging field can be electrically coupled with a remote server via a network.

First, in step S510, the server receives first charging data corresponding to at least one first charging operation from each of the electric vehicle charging stations in the charging field through the network during a first predetermined period. It should be noted that, in some embodiments, the first charging data may include at least a charging start time, a charging period, an output power, and/or related information indicating whether a load adjustment operation is being performed. Next, in step S520, the server trains a prediction model according to the first charging data corresponding to the at least one first charging operation received from each electric vehicle charging station during the first predetermined period, and in step S530, generates the energy prediction data of the charging field in a second predetermined period according to the prediction model. It is noted that, in some embodiments, the prediction model may be trained using the first charging data according to a machine learning technique. The prediction model can be a linear regression model. According to the first charging data and the prediction model, the energy prediction data of the charging field can be obtained. Similarly, in some embodiments, the energy prediction data may at least include an energy consumption estimation of the charging field at a specific time point. In some embodiments, the energy prediction data may further record whether the electric vehicle charging station performs a load adjustment operation at the specific time point, and the output power of each electric vehicle charging station during the load adjustment operation. Then, in step S540, the server continuously receives second charging data corresponding to at least one second charging operation from each of the electric vehicle charging stations via the network during the second predetermined period. Similarly, in some embodiments, the second charging data may include at least a charging start time, a charging period, an output power, and/or related information indicating whether a load adjustment operation is being performed. Next, in step S550, the server inputs the second charging data corresponding to the at least one second charging operation into the prediction model to train the prediction model. It should be noted that, the accuracy of the prediction model can be optimized by continuously training the prediction model.

Figure 6:
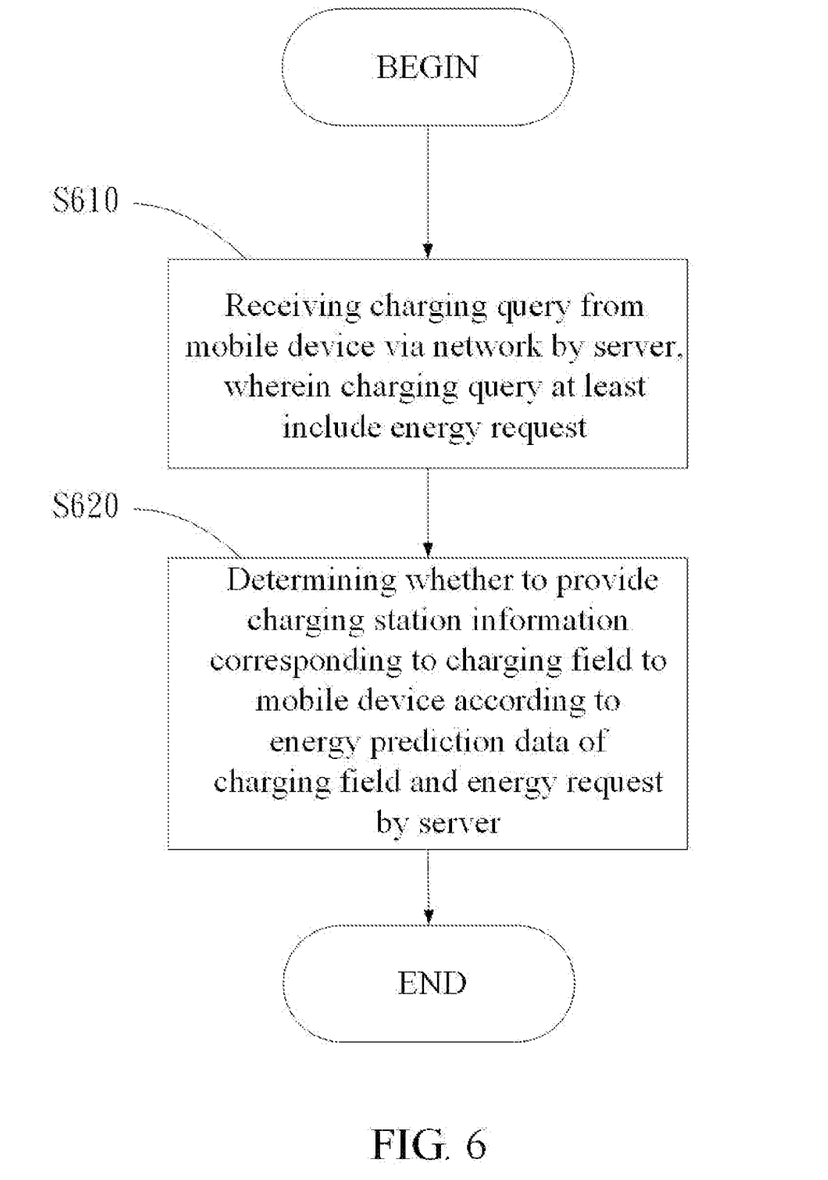
FIG. 6 is a flowchart of an embodiment of an application method of the energy prediction data of the invention.

FIG. 6 is a flowchart of an embodiment of an application method of the energy prediction data of the invention. In this embodiment, the energy prediction data can be used to provide feedback to the charging query of the corresponding electric vehicle user.

First, in step S610, the server receives a charging query from a mobile device via a network. It should be noted that, in some embodiments, the charging query may include at least an energy request, which may be, for example, a battery power, such as 15 Kw, or a charging efficiency, such as 7 Kw/h. It is noted that, in some embodiments, the charging query may further include a specific time point. Next, in step S620, the server determines whether to provide charging station information corresponding to the charging field to the mobile device according to the energy prediction data of the charging field and the energy request received from the mobile device. For example, when the estimated power consumption of the charging field at a specific time point obtained based on the energy prediction data is lower than a power limit of the charging field and the difference is sufficient to meet the energy request, the server can provide the charging station information corresponding to the charging field to the mobile device. In other words, the user of the mobile device can drive the electric vehicle to the charging field for charging at a specific time point. On the other hand, when the estimated power consumption of the charging field at the specific time point based on the energy prediction data is close to or higher than the power limit of the charging field and cannot meet the energy request, the server will not provide the charging station information corresponding to the charging field to the mobile device.

Figure 7:
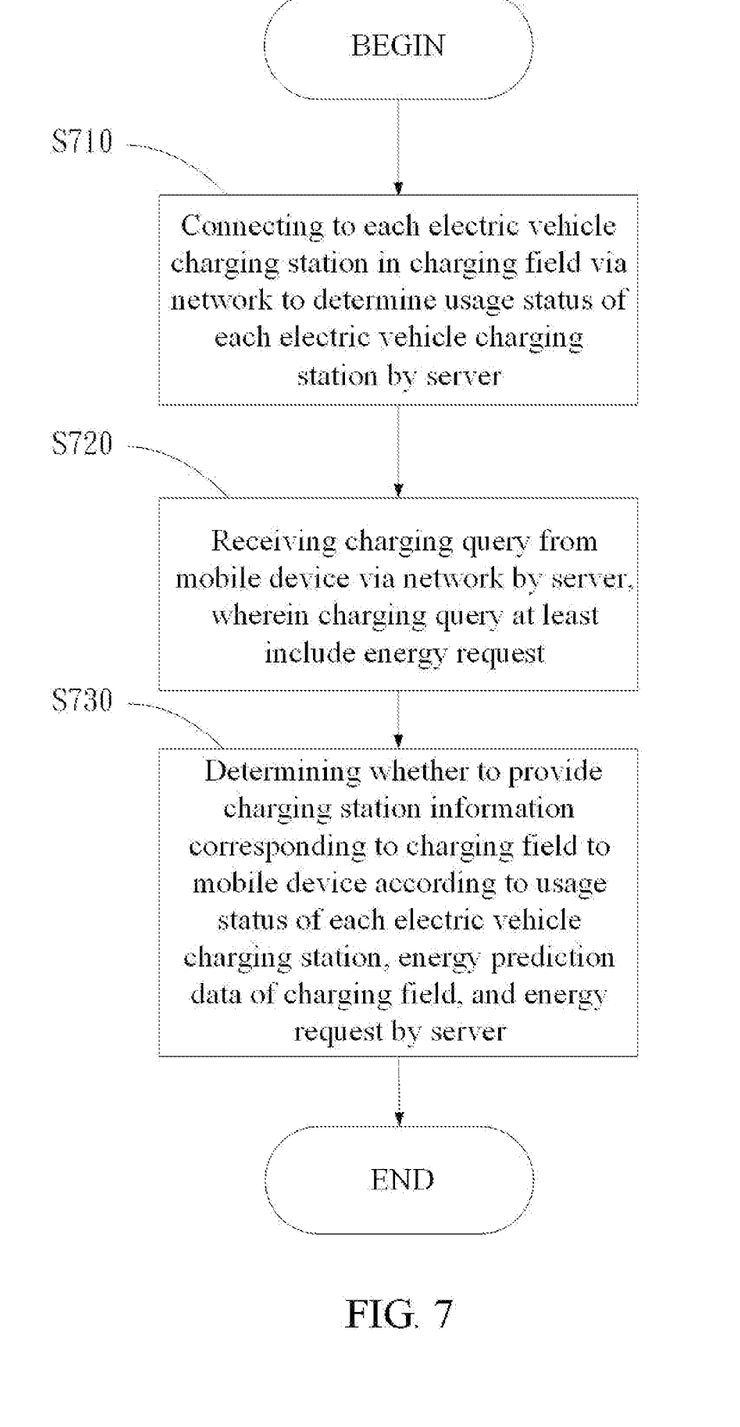
FIG. 7 is a flowchart of another embodiment of an application method of the energy prediction data of the invention.

FIG. 7 is a flowchart of another embodiment of an application method of the energy prediction data of the invention. In this embodiment, the energy prediction data can be used to provide feedback to the charging query of the corresponding electric vehicle user.

First, in step S710, the server connects to each of the electric vehicle charging stations in the charging field via the network to determine the usage status of each electric vehicle charging station. In step S720, the server receives a charging query from a mobile device via the network. It should be noted that, in some embodiments, the charging query may include at least an energy request, which may be, for example, a battery power, such as 15 Kw, or a charging efficiency, such as 7 Kw/h. Next, in step S730, the server determines whether to provide charging station information corresponding to the charging field to the mobile device according to the usage status of each of the electric vehicle charging stations, the energy prediction data of the charging field, and the energy request received from the mobile device. It is reminded that, in this embodiment, whether to provide the charging station information corresponding to the charging field to the mobile device can be determined according to the current usage situation of the electric vehicle charging stations and the estimated power consumption.

Figure 8:
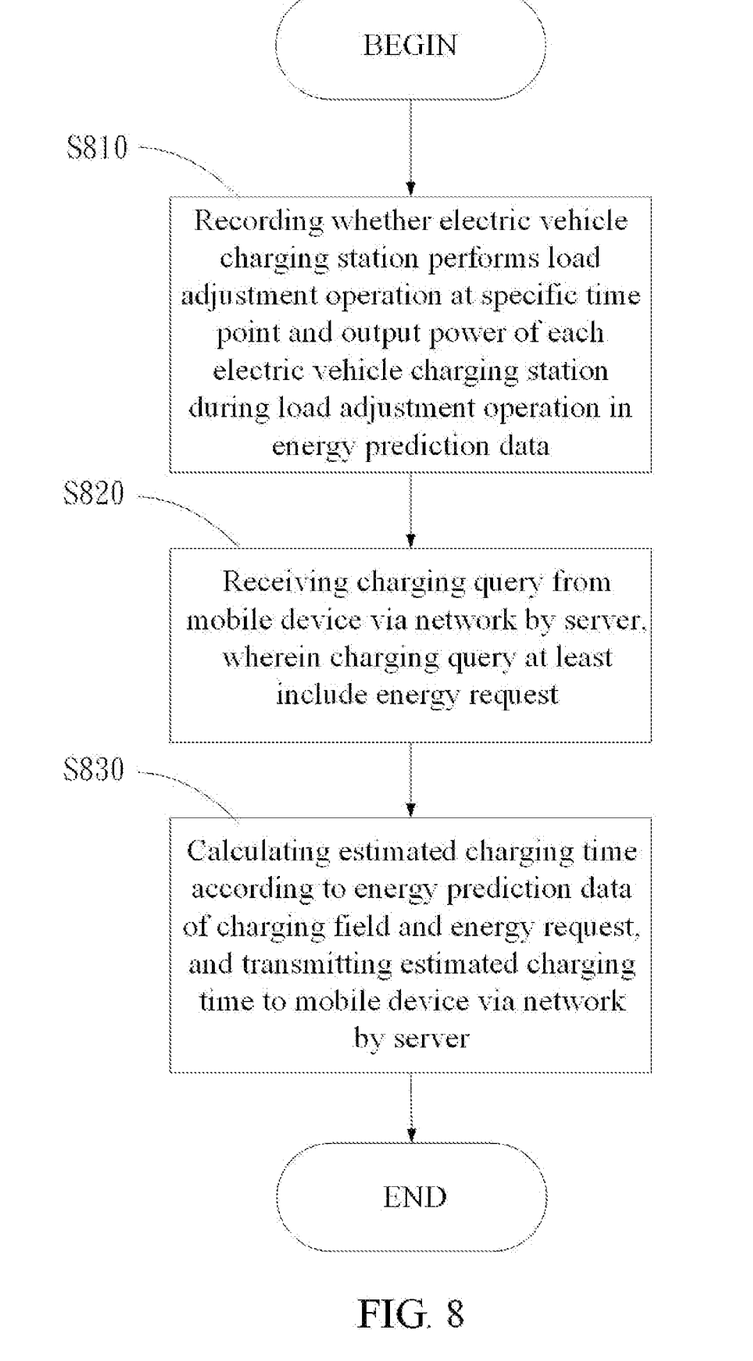
FIG. 8 is a flowchart of another embodiment of an application method of the energy prediction data of the invention.

FIG. 8 is a flowchart of another embodiment of an application method of the energy prediction data of the invention. In this embodiment, when the electric vehicle charging station performs the load adjustment operation, the energy prediction data can be used to calculate an estimated charging time to provide feedback to the charging query of the electric vehicle user.

First, in step S810, it is known from the energy prediction data of the charging field that whether the electric vehicle charging station performs a load adjustment operation at a specific time point, and the output power of each electric vehicle charging station during the load adjustment operation. In step S820, the server receives a charging query from a mobile device via the network. It should be noted that, in some embodiments, the charging query may include at least one energy request, which may be, for example, a battery power, such as 15 Kw, or a charging efficiency, such as 7 Kw/h. It is noted that, in some embodiments, the charging query may further include the specific time point. Next, in step S830, the server calculates an estimated charging time according to the energy prediction data of the charging field and the energy request received from the mobile device, and transmits the estimated charging time to the mobile device via the network.

As mentioned above, the power plant may contract with the operator of the electric vehicle charging station to perform a demand response procedure during power consumption peak hours, so as to reduce the output power of the electric vehicle charging station. Through the demand response procedure, the power plant can avoid the crisis of power shortages during the power consumption peak hours.

Figure 9:
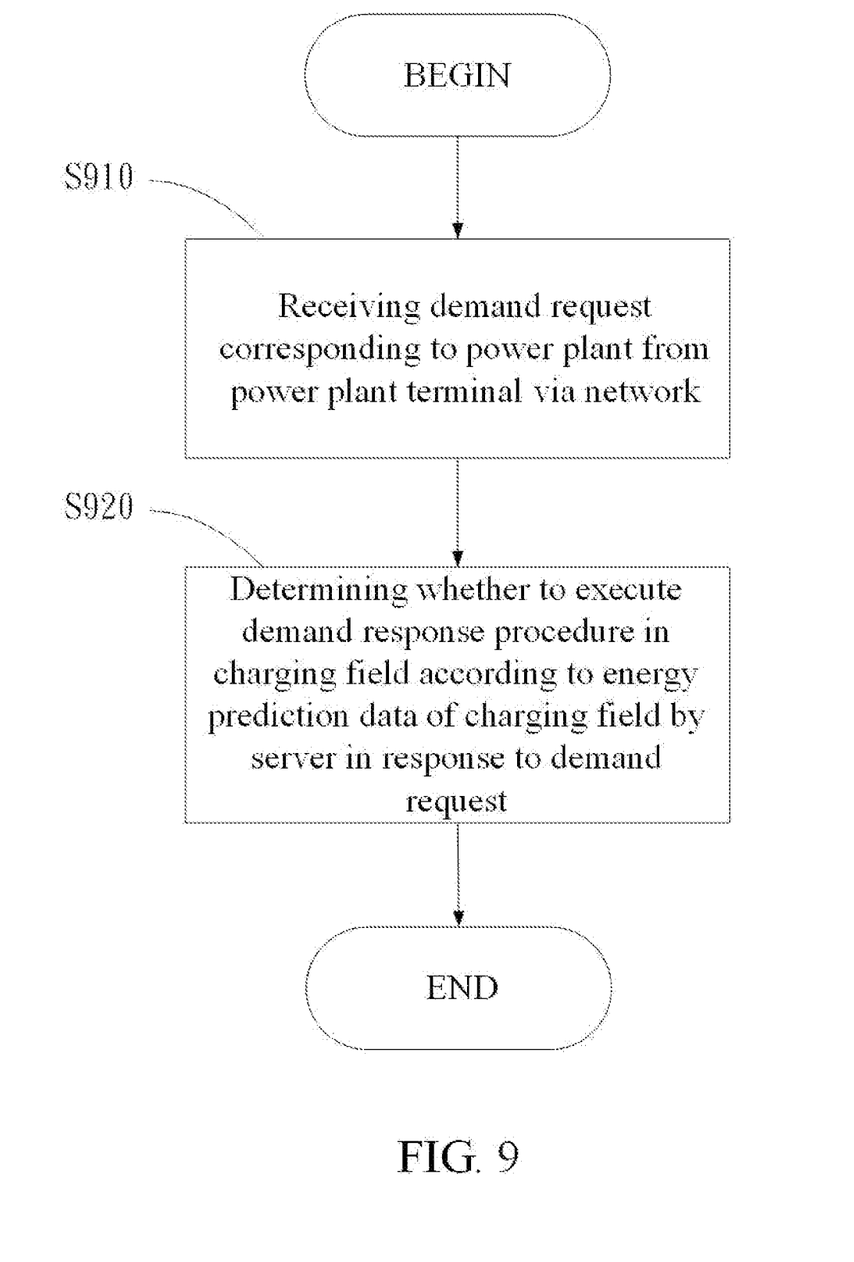
FIG. 9 is a flowchart of another embodiment of an application method of the energy prediction data of the invention.

FIG. 9 is a flowchart of another embodiment of an application method of the energy prediction data of the invention. In this embodiment, the energy prediction data can be used to evaluate whether the charging field should participate in the demand response procedure. First, in step S910, the server receives a demand request corresponding to a power plant from a power plant terminal via the network. Next, in step S920, in response to the demand request, the server determines whether to execute a demand response procedure in the charging field according to the energy prediction data of the charging field. For example, when the energy consumption of the charging field on a specific date and/or at a specific time point specified by the demand request is estimated to be lower than a specific value, the charging field can execute the demand response procedure, and receive a feedback reward for participating in the demand response.

Figure 10:
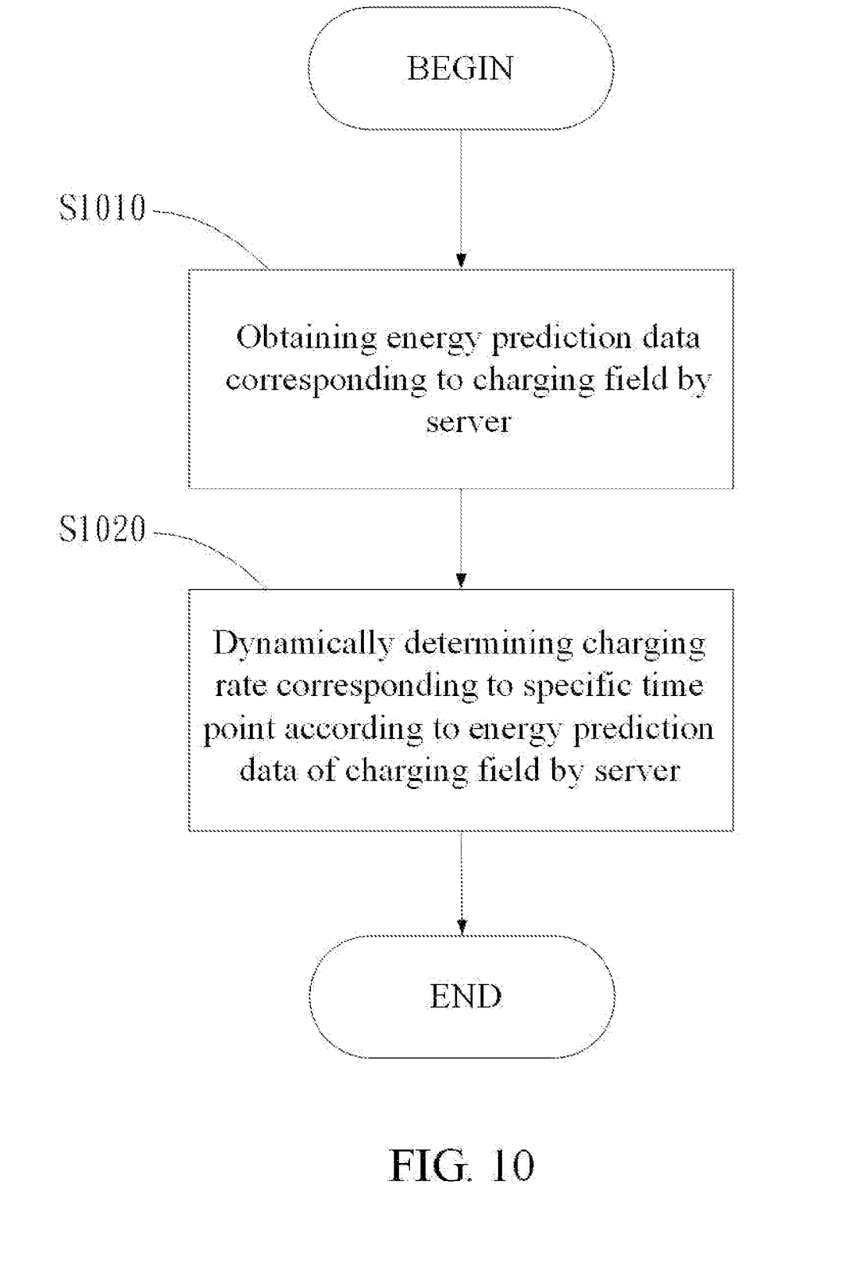
FIG. 10 is a flowchart of another embodiment of an application method of the energy prediction data of the invention.

FIG. 10 is a flowchart of another embodiment of an application method of the energy prediction data of the invention. In this embodiment, the energy prediction data can be used to dynamically determine the charging rate of the charging field. First, in step S1010, the server obtains energy prediction data corresponding to a charging field. Next, in step S1020, the server dynamically determines a charging rate corresponding to a specific time point according to the energy prediction data of the charging field. It is reminded that, in some embodiments, when the energy consumption estimation of the charging field at the specific time point is lower than a predetermined value, the charging rate corresponding to the specific time point can be set to be lower than a predetermined rate of the charging field.

Therefore, the management methods and systems for energy and charging requests of the electric vehicle charging field of the present invention can predict the future energy prediction data by using the historical charging data of the charging field, and perform the charging request management based on the energy prediction data. In addition, the energy consumption and charging request of the electric vehicle charging field can be properly planned, thereby increasing the use of electric vehicle charging stations and reducing the impact of electric vehicle development on the environment.

Management methods for energy and charging requests of the electric vehicle charging field, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A management method for energy and charging requests of an electric vehicle charging field for use in a charging field with a plurality of electric vehicle charging stations and a server connected with the respective electric vehicle charging stations via a network, comprising:
   receiving first charging data corresponding to at least one first charging operation from each of the electric vehicle charging stations via the network by a server during a first predetermined period, wherein the first charging data comprises at least a charging start time, a charging period, and an output power;
   generating energy prediction data of the charging field in a second predetermined period according to the first charging data corresponding to the at least one first charging operation received from each of the electric vehicle charging stations during the first predetermined period by the server, wherein the energy prediction data comprises at least an energy consumption estimation of the charging field at a specific time point;
   receiving a charging query from a mobile device via the network by the server, wherein the charging query includes at least one energy request; and
   determining whether to provide charging station information corresponding to the charging field to the mobile device according to the energy prediction data of the charging field and the energy request by the server.

2. The method of claim 1, further comprising:
   training a prediction model according to the first charging data corresponding to the at least one first charging operation received from each of the electric vehicle charging stations during the first predetermined period by the server; and
   generating the energy prediction data of the charging field in the second predetermined period according to the prediction model.

3. The method of claim 2, further comprising:
   receiving second charging data corresponding to at least one second charging operation from each of the electric vehicle charging stations via the network during the second predetermined period by the server; and
   continuously inputting the second charging data corresponding to the at least one second charging operation into the prediction model to train the prediction model by the server.

4. The method of claim 1, further comprising:
   connecting to each of the electric vehicle charging stations in the charging field via the network by the server to determine the usage status of each of the electric vehicle charging stations; and
   determining whether to provide the charging station information corresponding to the charging field to the mobile device according to the usage status of each of the electric vehicle charging stations, the energy prediction data of the charging field, and the energy request by the server.

5. The method of claim 1, further comprising:
   receiving a charging query from a mobile device via the network by the server, wherein the charging query includes at least one energy request; and
   calculating an estimated charging time based on the energy prediction data of the charging field and the energy request, and transmitting the estimated charging time to the mobile device via the network by the server.

6. The method of claim 1, further comprising:
   receiving a demand request corresponding to a power plant via the network by the server; and
   determining whether to execute a demand response procedure according to the energy prediction data of the charging field by the server in response to the demand request.

7. The method of claim 1, further comprising dynamically determining a charging rate corresponding to the specific time point according to the energy prediction data of the charging field by the server, wherein the charging rate corresponding to the specific time point is set to be lower than a predetermined rate of the charging field when the energy consumption estimation of the charging field at the specific time point is lower than a predetermined value.

8. A management system for energy and charging requests of an electric vehicle charging field for use in a charging field with a plurality of electric vehicle charging stations and a server connected with the respective electric vehicle charging stations via a network, comprising:
   a charging field with a plurality of electric vehicle charging stations; and
   a server connecting with the respective electric vehicle charging stations via a network, receiving first charging data corresponding to at least one first charging operation from each of the electric vehicle charging stations via the network during a first predetermined period, wherein the first charging data comprises at least a charging start time, a charging period, and an output power, and generating energy prediction data of the charging field in a second predetermined period according to the first charging data corresponding to the at least one first charging operation received from each of the electric vehicle charging stations during the first predetermined period, wherein the energy prediction data comprises at least an energy consumption estimation of the charging field at a specific time point and wherein the server further receives a charging query from a mobile device via the network, wherein the charging query includes at least one energy request, and determines whether to provide charging station information corresponding to the charging field to the mobile device according to the energy prediction data of the charging field and the energy request.

9. The system of claim 8, wherein the server further trains a prediction model according to the first charging data corresponding to the at least one first charging operation received from each of the electric vehicle charging stations during the first predetermined period, and generates the energy prediction data of the charging field in the second predetermined period according to the prediction model.

10. The system of claim 9, wherein the server further receives second charging data corresponding to at least one second charging operation from each of the electric vehicle charging stations via the network during the second predetermined period, and continuously inputs the second charging data corresponding to the at least one second charging operation into the prediction model to train the prediction model.

11. The system of claim 8, wherein the server further connects to each of the electric vehicle charging stations in the charging field via the network to determine the usage status of each of the electric vehicle charging stations, and determines whether to provide the charging station information corresponding to the charging field to the mobile device according to the usage status of each of the electric vehicle charging stations, the energy prediction data of the charging field, and the energy request.

12. The system of claim 8, wherein the server further receives a charging query from a mobile device via the network, wherein the charging query includes at least one energy request, and calculates an estimated charging time based on the energy prediction data of the charging field and the energy request, and transmits the estimated charging time to the mobile device via the network.

13. The system of claim 12, wherein the server further receives a demand request corresponding to a power plant via the network, and determines whether to execute a demand response procedure according to the energy prediction data of the charging field in response to the demand request.

14. The system of claim 8, wherein the server further dynamically determines a charging rate corresponding to the specific time point according to the energy prediction data of the charging field, wherein the charging rate corresponding to the specific time point is set to be lower than a predetermined rate of the charging field when the energy consumption estimation of the charging field at the specific time point is lower than a predetermined value.

15. A machine-readable storage medium comprising a computer program, which, when executed, causes a device to perform a management method for energy and charging requests of an electric vehicle charging field for use in a charging field with a plurality of electric vehicle charging stations and a server connected with the respective electric vehicle charging stations via a network, wherein the method comprises:

receiving first charging data corresponding to at least one first charging operation from each of the electric vehicle charging stations via the network by a server during a first predetermined period, wherein the first charging data comprises at least a charging start time, a charging period, and an output power;

generating energy prediction data of the charging field in a second predetermined period according to the first charging data corresponding to the at least one first charging operation received from each of the electric vehicle charging stations during the first predetermined period by the server, wherein the energy prediction data comprises at least an energy consumption estimation of the charging field at a specific time point;

receiving a charging query from a mobile device via the network by the server, wherein the charging query includes at least one energy request; and determining whether to provide charging station information corresponding to the charging field to the mobile device according to the energy prediction data of the charging field and the energy request by the server.

* * * * *